US008135393B2

(12) United States Patent
Chen et al.

(10) Patent No.: US 8,135,393 B2
(45) Date of Patent: Mar. 13, 2012

(54) SYSTEM AND METHOD FOR TRANSACTIONAL APPLICATION LIFECYCLE MANAGEMENT FOR MOBILE DEVICES

(75) Inventors: Xianfeng Chen, Mississauga (CA); Viera Bibr, Kilbride (CA); Brindusa Fritsch, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 746 days.

(21) Appl. No.: 12/212,775

(22) Filed: Sep. 18, 2008

(65) Prior Publication Data

US 2010/0069053 A1 Mar. 18, 2010

(51) Int. Cl.
*H04M 3/00* (2006.01)
(52) U.S. Cl. ......... 455/419; 455/418; 455/420; 455/466
(58) Field of Classification Search ............... 455/418, 455/419, 420, 466
See application file for complete search history.

(56) References Cited

U.S. PATENT DOCUMENTS

| | | | | |
|---|---|---|---|---|
| 5,974,312 A | * | 10/1999 | Hayes et al. | 455/419 |
| 6,308,061 B1 | * | 10/2001 | Criss et al. | 455/418 |
| 6,560,454 B2 | * | 5/2003 | Helle et al. | 455/412.1 |
| 6,687,901 B1 | * | 2/2004 | Imamatsu | 717/173 |
| 6,865,387 B2 | * | 3/2005 | Bucknell et al. | 455/418 |
| 6,970,698 B2 | * | 11/2005 | Majmundar et al. | 455/419 |
| 7,200,390 B1 | * | 4/2007 | Henager et al. | 455/419 |
| 7,366,460 B2 | * | 4/2008 | O'Farrell et al. | 455/3.06 |
| 7,623,853 B2 | * | 11/2009 | Vikse et al. | 455/419 |
| 7,894,808 B2 | * | 2/2011 | Nakayama et al. | 455/419 |
| 2003/0108039 A1 | | 6/2003 | Shell et al. | |
| 2005/0091288 A1 | | 4/2005 | Ji et al. | |
| 2008/0076401 A1 | * | 3/2008 | Zeilingold et al. | 455/418 |

FOREIGN PATENT DOCUMENTS

EP 1-318-452 A 6/2003

OTHER PUBLICATIONS

Eliot B Moss J :Nested Transactions: An approach to Reliable Distributed Computing Apr. 1, 1981 p. 8, para 1-para 2.

* cited by examiner

*Primary Examiner* — Olumide T Ajibade Akonai (57) ABSTRACT

The present disclosure relates to networks and lifecycle transaction management of mobile devices. There is provided a system and method for managing the lifecycle of applications on mobile devices. The system has components for implementing a method comprising the steps of creating a transaction context comprising a transaction command, sending the transaction context in a transaction context message to a plurality of mobile devices, and evaluating an ending scenario based on transaction statuses of the plurality of mobile devices.

18 Claims, 9 Drawing Sheets

SYSTEM AND METHOD FOR TRANSACTIONAL APPLICATION LIFECYCLE MANAGEMENT FOR MOBILE DEVICES

TECHNICAL FIELD

The present disclosure relates generally to wireless networks, and more specifically to application lifecycle management of mobile devices that use the wireless networks.

BACKGROUND

Mobile devices are increasingly used in an enterprise environment. The operation of mobile devices requires that various applications be loaded, updated, quarantined or deleted, commonly referred to as application lifecycle management.

Mobile application lifecycle management on a large volume of devices is a tremendous work for Information Technology (IT) administrators. In an enterprise environment, it takes lots of time and effort to deploy and manage mobile applications on mobile devices correctly and efficiently.

Mobile devices are connected to enterprise services through wireless networks can experience connectivity problems such as an unstable wireless connection, no wireless coverage, running out of battery, etc. These connectivity problems make it difficult to manage the application lifecycle of mobile devices.

BRIEF DESCRIPTION OF THE DRAWINGS

Embodiments of the system and method for lifecycle transaction management will now be described by way of example with reference to the following drawings in which.

DETAILED DESCRIPTION

The present disclosure provides a method of transactional application lifecycle management for mobile devices. The method comprises the steps of creating a transaction context comprising a transaction command, sending the transaction context in a transaction context message to a plurality of mobile devices using a reliable message protocol, evaluating an ending scenario based on transaction statuses of the plurality of mobile devices, and sending an ending scenario message to each of the plurality of mobile devices based on the evaluation of the ending scenario.

The present disclosure provides a transactional application lifecycle management system comprising a lifecycle transaction server. The lifecycle transaction server comprises a lifecycle transaction server comprising a reliable message component for sending and receiving messages reliably to and from a plurality of mobile devices, and a transaction component comprising a server transaction manager for creating a transaction context comprising a transaction command to be sent to a plurality of mobile devices using the reliable message component, for evaluating an ending scenario based on transaction statuses of the mobile devices, and sending an ending scenario message to each of the plurality of mobile devices based on the evaluation of the ending scenario.

The present disclosure provides a method of transactional application lifecycle management on mobile devices. The method comprises the steps of receiving at a mobile device a transaction context message comprising a transaction context, creating a device save point associated with the transaction context of the transaction context message, the device save point storing a device application state, executing a transaction command associated with the transaction context as a device transaction, and sending a transaction execution message to the server using a reliable message protocol, the transaction execution message indicating a status of executing the command associated with the transaction context.

The present disclosure provides a mobile device for managing a mobile device application lifecycles. The mobile device comprises a memory for storing instructions, a processor for executing the instructions stored in memory. The execution of the instructions by the processor implements a device transaction manager comprising a message processor for receiving a transaction context message and sending a transaction execution message to the server using a reliable message protocol, the transaction execution message indicating a status of executing the command associated with the transaction context, a command controller for executing the transaction command associated with the transaction context, and a save point controller for creating a device save point associated with the transaction context of the transaction context message, and a reliable messaging component for receiving the transaction context message and sending the transaction execution.

The present disclosure provides a computer program product for transactional application lifecycle management of mobile devices. The computer program product comprises a computer readable medium embodying program code means for implementing a method of lifecycle management of mobile devices. The method comprises the steps of creating a transaction context comprising a transaction command, sending the transaction context in a transaction context message to a plurality of mobile devices using a reliable message protocol, evaluating an ending scenario based on transaction statuses of the plurality of mobile devices, and sending an ending scenario message to each of the plurality of mobile devices based on the evaluation of the ending scenario.

The present disclosure provides a computer program product for transactional application lifecycle management on mobile devices. The computer program product comprising a computer readable medium embodying program code means for implementing a method of for lifecycle management on mobile devices. The method comprises the steps of receiving at a mobile device a transaction context message comprising a transaction context, creating a device save point associated with the transaction context of the transaction context message, the device save point storing a device state, executing a transaction command associated with the transaction context as a device transaction, and sending a transaction execution message to the server using a reliable message protocol, the transaction execution message indicating a status of executing the command associated with the transaction context.

The application transactional lifecycle management system and method described herein provide a flexible atomic, efficient and error-tolerant mechanism to manage the lifecycle of applications on mobile devices across large volumes of mobile devices. A transaction is executed on mobile devices. The lifecycle of the applications are managed by the execution of the transaction. The transaction is sent to the mobile devices from a server that manages the transactions in a transaction context.

Figure 1:
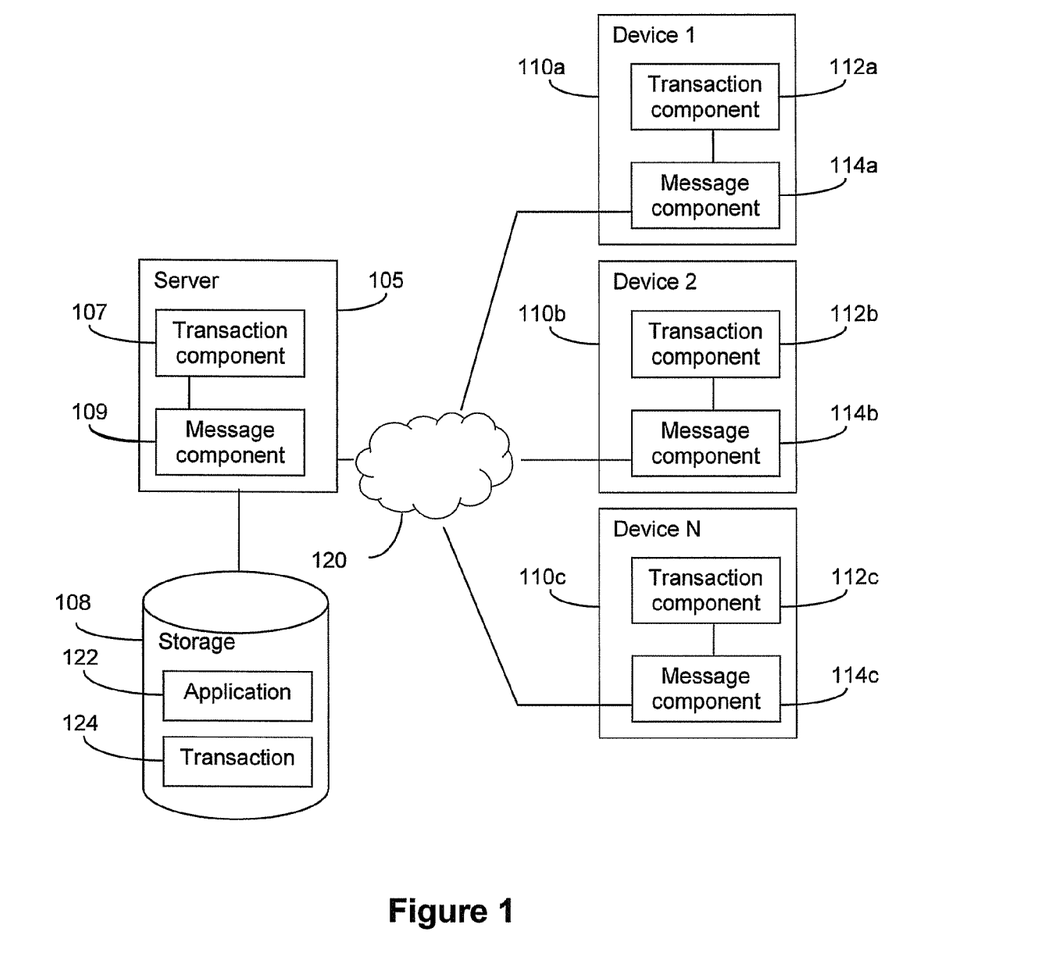
FIG. 1 depicts in a block diagram an application lifecycle management system in accordance with the present disclosure.

FIG. 1 depicts in a block diagram a lifecycle management system in accordance with the present disclosure. The system comprises an application lifecycle transaction management server 105 in communication with one or more devices 110a-c through a wireless network 120. The wireless network 120 may include both wired and wireless components, as is well understood in the art. The lifecycle transaction management server 105 comprises a lifecycle transaction component 107. The lifecycle transaction component 107 communicates with device lifecycle transaction components 112a-c using the network 120. The lifecycle transaction component 107 communicates with the mobile devices using a messaging component 109. The message component 109 communicates with a device message component 114a-c of the mobile devices 110a-c through the network 120.

The mobile device lifecycle transaction components 112a-c prepares and execute transactions on the respective mobile devices 110a-c. When preparing a transaction the device lifecycle transaction components 112a-c creates a device save point automatically. The device save point saves the status of the device prior to executing the transaction. The device save point may store information including, for example, application persisted data (for upgrading, or deleting applications), old configurations, application information, etc. The device save point is used by the device lifecycle transaction components 112a-c in case the transaction is rolled back.

The server lifecycle transaction component 107, manages transactions on mobile device, including creating or receiving a transaction definition and creating a transaction context, coordinating the execution of the transactions on the mobile devices (creating save point, sending the transaction context to all participating devices, receiving transaction execution messages about transaction execution status on devices, etc), and evaluating ending scenarios (commit or rollback transaction). The transaction context on the server includes information about the execution of the transactions executing on the mobile devices. For example, the transaction context on the server may include information about what mobile devices are executing the transaction as part of the transaction context, what messages have been sent to the mobile devices participating in the transaction context or what messages have been received from the mobile devices participating in the transaction context. The server lifecycle transaction component 107 may save a save point before sending transactions to devices for rolling back transactions. The server save point may include information such as device status, application data on participating devices, application version information, etc. The lifecycle transaction component 107 may also evaluate ending scenarios of transaction contexts to determine if the transaction should be rolled back or committed on the mobile devices. The ending scenario may be evaluated as a result of different events, such as expiration of a timeout timer, receiving transaction execution result messages from all devices involved in the transaction context, receiving an error from one of the mobile devices involved in the transaction context, etc. A storage device 108, may be provided for storing application 122 and transaction 124 data in relation to the mobile devices. The storage device 105 may be part of the server 105, or it may be connected to the server 105, for example through a network.

The messaging component 109 and the device messaging components 114a-c implement a reliable messaging protocol. The reliable messaging protocol ensures that messages are received in the order sent. This ensures that the server transaction component 107 and the device transaction component 112 will receive the messages sent to each other, even if a device is temporarily unreachable. The reliable message protocol further ensures that messages are delivered to the transaction components 107, 112 in the order they were sent in. The messages are delivered once and only once using the reliable message protocol. If the transaction commands are sent in multiple messages, the reliable message protocol ensures that the transaction commands will be received in the proper order for execution. The message component 109 and the device messaging component 114 may be incorporated into the transaction component 107 and the device transaction component 112. Alternatively, the messaging component 109 and the device messaging component 114 may be implemented separate from the transaction components 107, 112, for example as part of an operating system or runtime environment on the server 105 or mobile device 110.

Figure 2A:
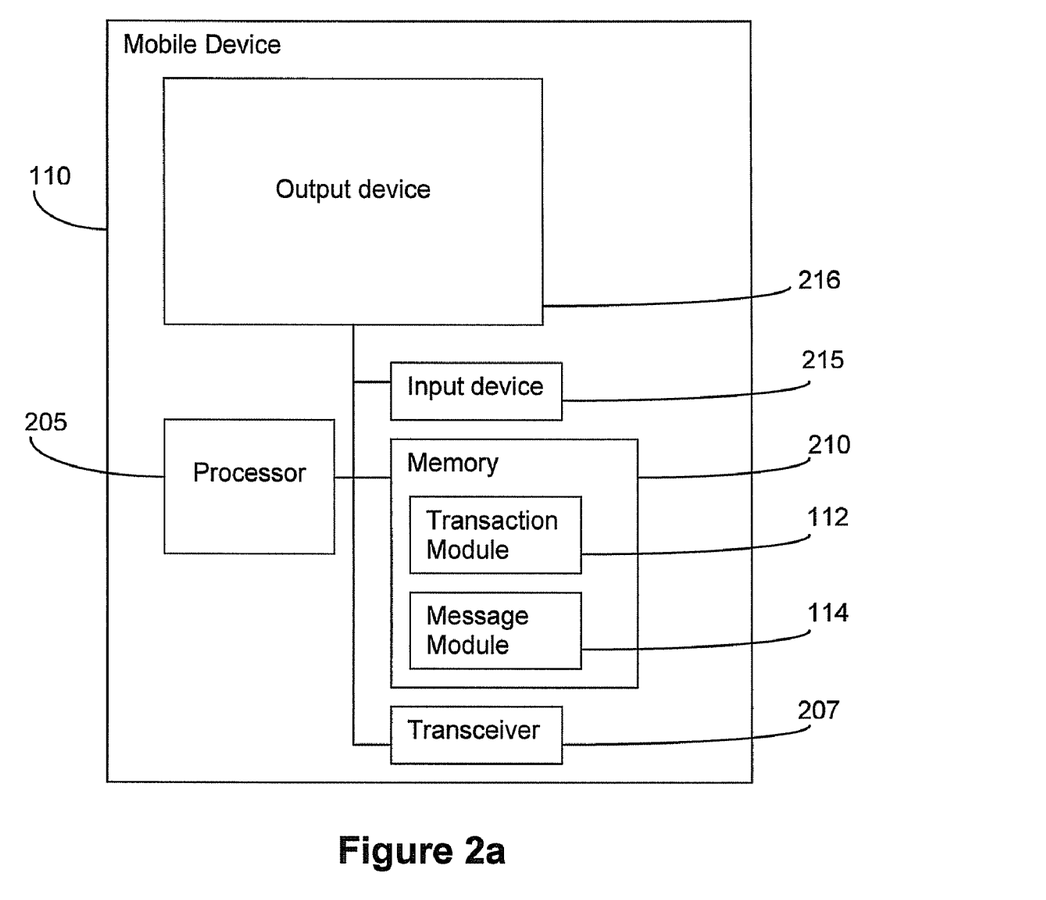
FIG. 2a depicts in a block diagram, a mobile device in accordance with the lifecycle management system according to the present disclosure.

FIG. 2a depicts in a block diagram a mobile device 110 in accordance with the lifecycle management system according to the present disclosure. The device 110 comprises a processor 205 for executing instructions stored in memory 210. The processor 205 is coupled to a transceiver 207 for communicating wirelessly with a network, such as network 120. The device 110 also comprises an output device 216 such as a display screen, and an input device 215, such as a keyboard, track wheel, trackball, etc. The input device 215 and the output device 216 may be combined as a single device such as a touch sensitive display.

The instructions stored in memory 210 and executed by the processor 205 may include instructions to configure the processor 205 so as to provide various components such as a device operating system, mobile applications, communication protocols, security protocols, application lifecycle transaction management components, etc. These components may have various settings, instructions and variables. For example, a version of a mobile application may have a setting indicating the version number of the application, and the application may use various instructions to implement application features. A device state may be described by various settings and properties stored in the device memory 210.

Figure 2B:
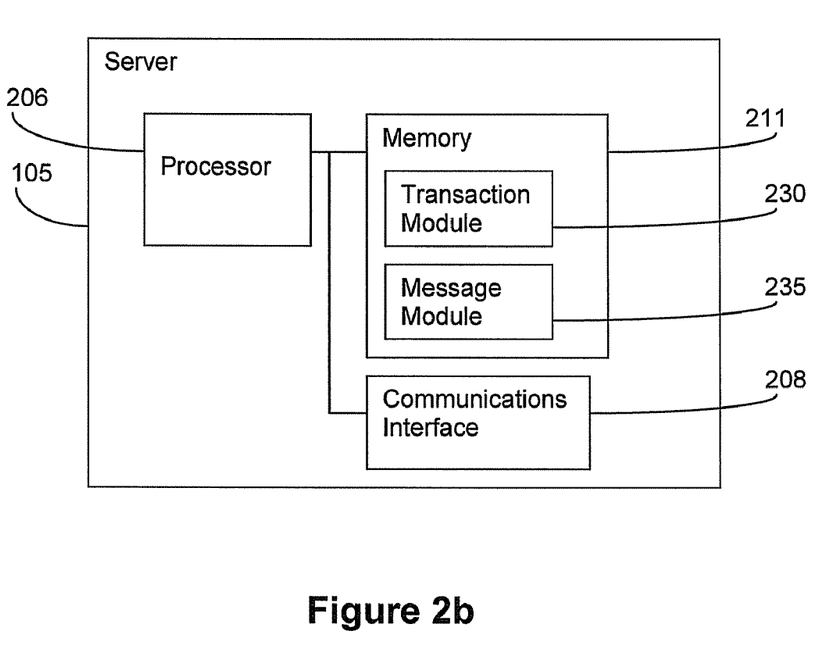
FIG. 2b depicts in a block diagram, a server in accordance with the lifecycle management system according to the present disclosure

FIG. 2b depicts in a block diagram, a server in accordance with the lifecycle management system according to the present disclosure. The server 105 comprises a processor 206 for executing instructions stored in memory 210. The processor 206 is coupled to a communications interface communicating with a network, such as network 120. The server 105 may further comprise input and output devices (not shown).

The instructions stored in memory 210 comprise a transaction module 230 and a message module 235. The instructions of the transaction module 230 when executed by the processor provide for the transaction component 107. The instructions of the message module 235 when executed by the processor provide for the message component 109.

Figure 3:
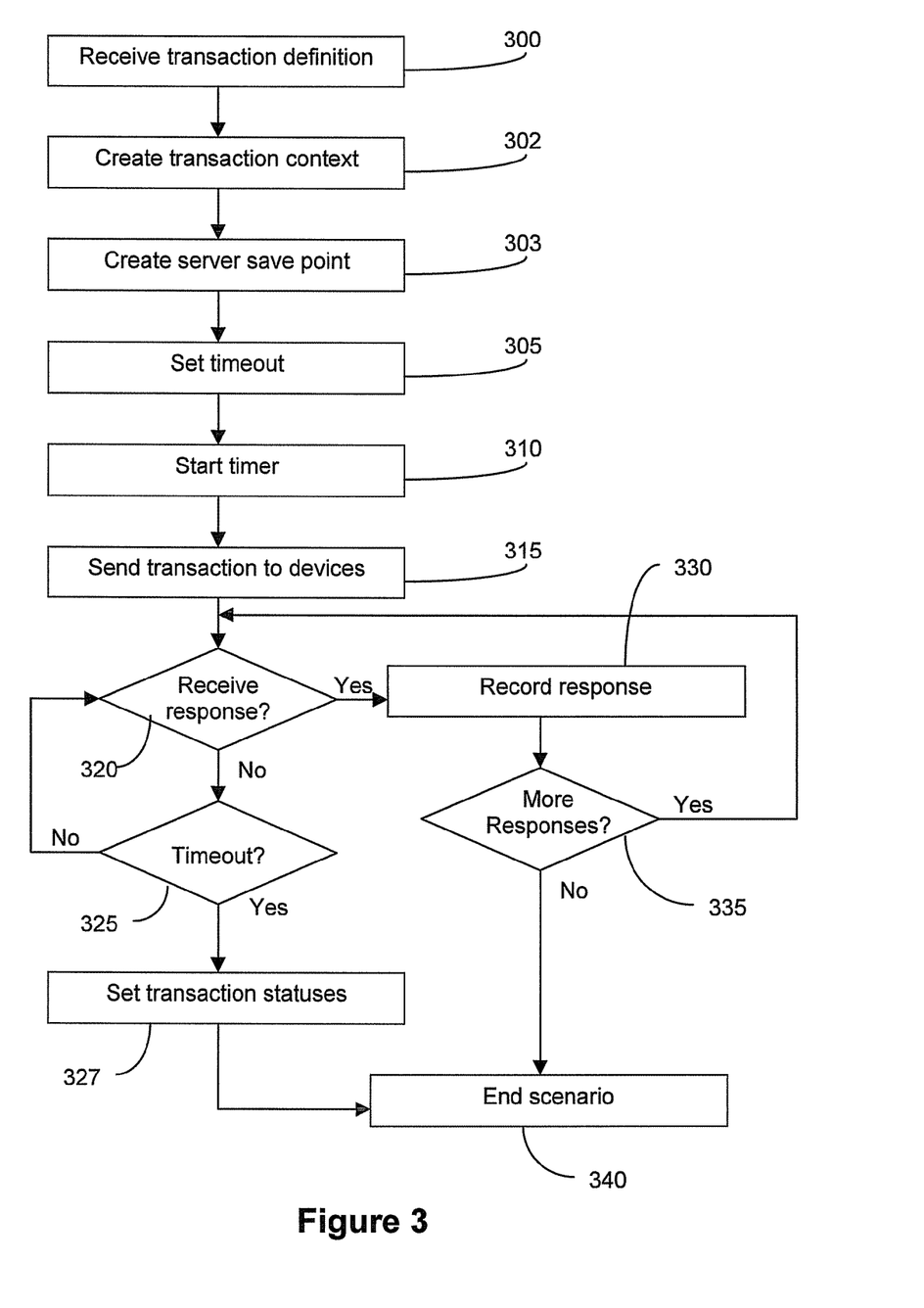
FIG. 3 depicts in a flow chart a server method for providing application lifecycle transaction management.

FIG. 3 depicts in a flow chart, a server method for providing application lifecycle transaction management. The method begins at step 300 by creating a transaction definition for defining the transaction context. At step 302, the server 105 creates a transaction context based on the transaction definition. At step 303 a server save point is stored. The server save point may store application metadata of applications on the mobile device such as, for example, application version numbers. The application metadata associated with the mobile device may be rolled back based on the execution of the transaction on the mobile devices, and the ending scenario. At step 305 the server may set a timeout timer and at step 310 start the timeout timer. The timeout timer, if used, should be started in a separate process. At step 315 the lifecycle management server 105 (see FIG. 1) sends the transaction context to the devices 110 (see FIG. 1) that are being managed in a transaction message. At step 320 the server 105 waits to receive response from the devices 110 that the transaction messages were sent to. If no responses were received (No at step 320), the server 105 continues to step 325 and it is determined if the timeout timer has expired. If the timeout timer, if used, has not expired (No at step 325) the server 105 continues back to step 320 to receive a response. If the timeout timer has expired (Yes at step 325) the transaction status is set at step 327 for mobile devices that have not sent a response, or the mobile devices that do not have a response recorded. Once all of the mobile devices have the transaction status set, processing continues to evaluating the ending scenario at step 340.

If at step 320 a response is received (Yes at step 320), the server 105 records the response at step 330. The transaction status of the transaction executed on the mobile device may be set when the response is recorded. At step 335 the server 105 checks to see if there are more responses waiting to be received, if there are (Yes at step 335), then processing returns to step 320 to receive a response. The server 105 may also determine, for example at step 330, if a received response indicates an error executing the transaction on a device 110, and if an error has occurred processing may proceed to setting the transaction status of mobile devices for which no transaction status is set. Processing continues to evaluating the ending scenario at step 340. If at step 335 it is determined that responses have been received from all of the devices involved in the transaction context (No at step 335), the timeout timer may be cancelled and processing may continue to evaluating the ending scenario at step 340. At step 340 the server 105 determines the proper ending scenario based on the transaction status of the mobile devices participating in the transaction context. The transaction status of a mobile device may be set based on the transaction execution status of the transaction on the mobile device sent in a response message, or it may be set by the server if a response has not been received from the mobile device.

Figure 4:
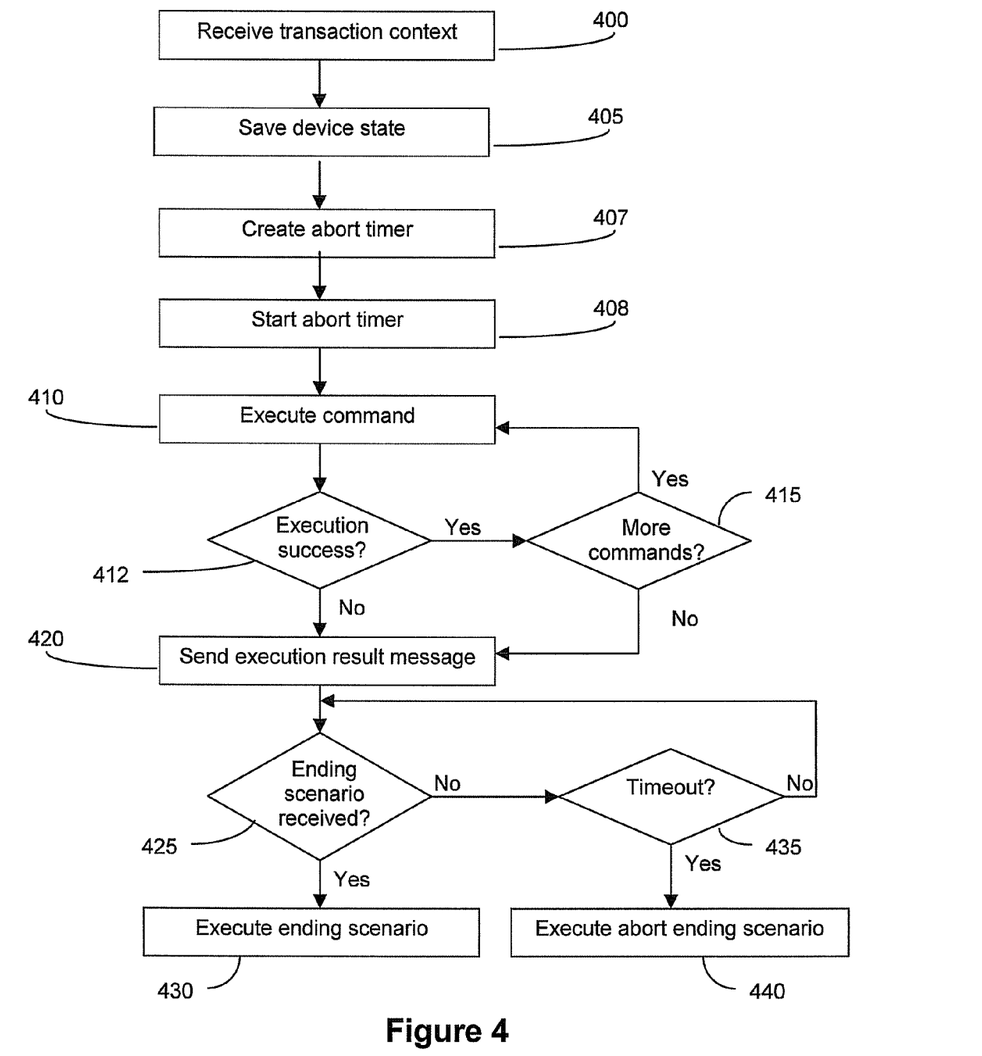
FIG. 4 depicts in a flow chart a device method for providing transaction application lifecycle management.

FIG. 4 depicts in a flow chart, a mobile device method for providing application lifecycle transaction management. The method begins by receiving a transaction message defining a transaction context at step 400 from the server. The device creates a device transaction based on the received transaction context, and at step 405 creates a device save point storing the device state. At step 407 the device creates an abort timer based on the received transaction context. At step 408 the abort timer is started. The abort timer typically runs in a separate process. At step 410 the device 110 executes a transaction context definition command received from the server. At step 412 it is determined if the command was successfully executed, if it was successful (Yes at step 412), then at step 415 the device 110 determines if there are further transaction commands. If there are more transaction commands (Yes at step 415), then the device 110 executes the next command at step 410. If there are no further commands (No at step 415) to be executed, or if a command is not successfully executed (No at step 412), the device returns a transaction execution result message to the server at step 420. At step 425 it is determined if an ending scenario message has been received. If an ending scenario has been received (Yes at step 425) it is executed at step 430. If an ending scenario has not been received (No at step 425) it is determined if the abort timer has expired at step 435. If the abort timer has not expired (No at step 435) processing continues to 425 again to determine if an ending scenario message has been received. If the abort timer has expired (Yes at step 435) then the abort ending scenario is executed at step 440.

Figure 5:
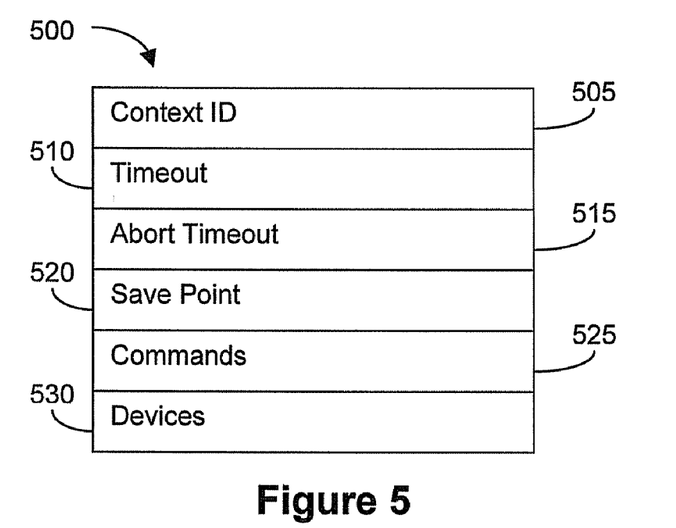
FIG. 5 depicts in a logical schematic a transaction context in accordance with the present disclosure.

FIG. 5 depicts in a logical schematic, an illustrative transaction context 500. The transaction context 500 defines the transaction that will be executed by the mobile devices in regards to the management of an application on the mobile devices. The transaction context 500 comprises a unique transaction ID 505 that may be used to identify the particular transaction context 500. This may allow the server 105 to use multiple transaction contexts 500 at a time. Although multiple transaction contexts may be defined in a server 105, and sent to mobile devices 110, each transaction context 500 should be executed on the mobile devices in sequence. Each transaction on a mobile device is treated as an atomic transaction, so that only one transaction may be executed on a device 110 at a time. The transaction context 500 may also include a timeout timer value 510 for indicating a server 105 timeout for sending the transaction context 500 to the devices 110 and receiving the replies from the devices 110. The timeout timer value 510 does not need to be included in the transaction message sent to the mobile devices. The transaction context 500 may also comprise an abort timeout value 515 for the device 110. If the device 110 does not receive an ending scenario message from the server 105 within the abort timeout value 515, then the device 110 rolls back the transaction. The transaction context 500 may also include a save point definition 520. The save point definition 520 may indicate information that should be saved for transaction roll back, such as the variables, properties, instructions, and other memory contents that may be changed during the execution of the transaction context 500. The transaction context 500 may also include the transaction commands 525 to be executed as part of the transaction. The device executes the transaction commands 525 in the specific order they appear in the transaction context 500. Transaction commands 525 from server to device may include, for example:

Transaction start and end commands
    Install an application;
    Upgrade an application;
    Delete an application;
    Quarantine an application;
    Un-Quarantine an application;
    Suspend application;
    Resume application; and
    Change device configuration.

The transaction context 500 may be sent to devices 110 in a single message. Alternatively, the transaction context 500 may also be sent in multiple messages, based on the complexity of the transaction or the size of the messages to be sent to the mobile devices. In this case, the first message would be a transaction start command, a series of transaction command messages are then sent to the device. Once all of the transaction commands have been sent to the device a transaction end command is sent to the device to indicate that there are no more transaction commands.

The transaction context 500 may also comprise a list of mobile device identifiers 530. The mobile device identifiers indicate what mobile devices are participating in the transaction context. The mobile devices may be identified using, for example, a personal identification number (PIN), an International Mobile Equipment Identifier (IMEI), Electronic Serial Number (ESN) or any other unique identifier associated with the device.

A transaction context 500 comprises a series of transaction commands for managing the lifecycle of applications on the mobile devices. The commands may be received at the device in one or more than one message and are executed in order as a single operation. If one of the commands is not executed properly, then none of them should have been executed. The device sends a transaction execution result message back to the server once the commands have been executed. The transaction execution result message indicates whether the transaction commands were successfully executed on the device or not, and if they weren't it may indicate the reasons for failing to execute.

Once the server 105 receives all of the transaction execution result messages from the devices 110, or the timeout timer expires, the server 105 evaluates the ending scenario. The ending scenario may also be evaluated if a transaction failed to successfully execute on one of the mobile devices. For example if the ending scenario indicates that the if a transaction fails on a single device, all devices should roll back the transaction, then upon receiving a message indicating a transaction execution failure, the ending scenario may be evaluated without requiring the responses from the other mobile devices participating in the transaction context.

Evaluating the ending scenario may result in various instructions being sent to the mobile devices in an ending scenario message. For example, if all of the mobile devices executed the transaction successfully, then the ending instructions may indicate that the transaction should be committed on all mobile devices 110. If the transaction was not successfully executed on some devices 110, the instructions may indicate to rollback the transaction on all of the devices 110. Rolling back a transaction on a mobile device restores the mobile device state to that stored in the device save point. The application metadata associated with the mobile device may be restored on the server to that stored in the server save point. When a device 110 commits the transaction, it deletes the device save point of the transaction on the mobile device, and makes final the results of the transaction commands. The server may delete the application metadata associated with the mobile device from the server save point. A transaction on a mobile device may be committed manually by an administrator or by the server transaction component automatically.

When the ending scenario is evaluated, the transaction statuses are inspected to determine the result of executing the transaction commands on the devices. Based on the transaction statuses, instructions to be sent to the mobile devices for ending the transaction are determined. For example, the instructions may include instructions for committing the transaction on all devices if all devices have successfully executed the transaction. Rolling back the transaction on all devices if any, or all, devices failed to successfully execute the transaction. If any mobile devices have failed to execute the transaction, then the instructions may include status specific instructions for the mobile device. The status specific instructions for the mobile devices will commit the transaction on the mobile devices that have successfully executed the transaction, and rollback the transaction on the mobile devices that failed to successfully execute the transaction. The determination of the instructions of the ending scenario can be based upon a transaction status threshold. The transaction status threshold may be a threshold indicating a threshold of successfully executed transactions, or indicating a threshold of unsuccessfully executed transactions. For example, if 30% or more of transactions were successfully executed, the instructions may include the status specific instructions, for committing successful transactions and rolling back failed transactions. If fewer than 30% of transactions were successfully executed, the instructions may specify rolling back the transaction on all mobile devices.

When a transaction is rolled back on a device, the device restores the device state to the device save point of the transaction, and the device save point is deleted. A server may re-do transactions. For example, it may be desirable to specify that a transaction should be attempted to be executed on a device more than once.

A transaction context may have an associated timeout timer. The timeout timer value is a specified time span that starts when the transaction server starts execution of the transaction context, for example when the server sends the transaction messages to the mobile devices, and is typically selected to be a time sufficient for all devices to have executed the transaction, for example 1 hour. When the timeout timer expires the server 105 evaluates the execution of the transaction on the participated devices 105 and commits or rolls back the transaction according to the executing results and the transaction ending scenario (for example commit on all devices succeed, commit on partial device succeed, rollback on any device failure, rollback on partial device failure, etc.)

An abort timeout timer may be used for aborting the transaction on participating devices 110 in case an ending scenario message is not received from the server 105 for a specified time (the abort timeout value), typically selected to be a long period of time, for example 1 day. Upon expiration of the abort timeout timer, the device executes an abort ending scenario, for example, indicating that the transaction should be rolled back.

A transaction ending scenario specifies whether to commit or roll back transactions depending on the result of the execution of the transaction on the particular devices 110. The results of executing the transaction on each device may be indicated in a transaction execution message sent from the device. The server may set the transaction status of the device based on the transaction execution message once the transaction execution message is received. The server may also set the transaction status of mobile devices that have not sent a response, or for the mobile devices for which no response has been recorded prior to evaluation of the ending scenario. If the timeout timer expires prior to receiving a transaction execution message from a device, the transaction status of the device would indicate, for example, that a transaction execution message was not received. Transactions on the mobile devices may be committed when all of the transactions were successfully executed on all of the devices 110. Transactions may also be committed on particular devices 110 if the transactions were not successfully executed on all devices. The ending scenario may also indicate that if a single device 110 has not successfully executed the transaction, then all devices 110 should roll back the transaction. Other ending scenarios may be possible, such as, for example, rolling back transactions for devices 110 that failed to successfully execute the transaction, and committing transactions for devices 110 that successfully executed the transaction.

The server 105 may create and store a server save point prior to beginning execution of a transaction context. If the transaction is subsequently rolled back on devices 110, the server 105 may use the server save point to revert to the state of the server prior to executing the transaction. The server save point may include information about the lifecycle of an application on the individual mobile devices participating in the transaction context.

Figure 6A:
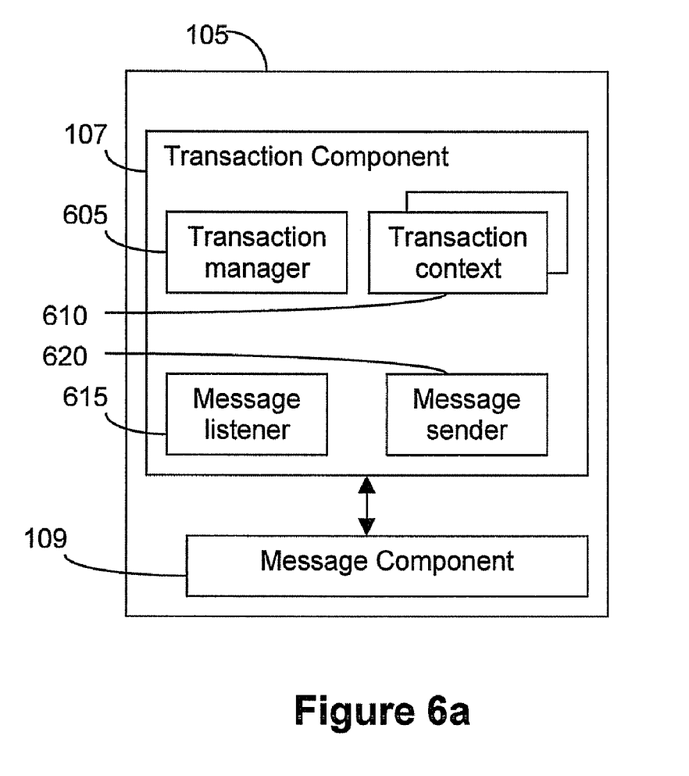
FIG. 6a depicts in a block diagram, illustrative logical components of a lifecycle management server in accordance with the present disclosure.

FIG. 6a depicts in a block diagram, illustrative logical components of a lifecycle management server 105 in accordance with the present disclosure. The transaction server typically communicates with various mobile devices through a network. It is also possible to utilize the lifecycle transaction management server 105 without any devices, for example for testing or design purposes. The server 105 comprises a message component 109 for sending reliable messages to the device. The message component 109 may be implemented as part of the transaction component 107 or alternatively may be provided by other components of the server. For example, the transaction may use a TCP/IP stack provided by the operating system of the server for sending reliable messages to devices. Alternatively the message component 109 may be implemented as part of the transaction component 107, and may provide reliable message delivery using an unreliable messaging protocol provided by other components of the server, such as UDP/IP stack provided by the operating system of the server. The server transaction component 107 provides application lifecycle transaction management. The transaction component 107 comprises a transaction manager 605, one or more transaction contexts 610, a message listener 615, and a message sender 620.

The transaction manager 605 may receive a transaction definition. The transaction definition describes the transaction context, including the transaction commands, devices 110 participating in the transaction, ending scenarios, transaction timeout value, abort timeout value and device information to store for the device and server save points. Once the transaction manager 605 receives the transaction description, a transaction context 500 may be created from the transaction definition. The transaction context 500 may be sent to the devices 110 participating in the transaction context.

The transaction component 107 also comprises a message listener 615 and message sender 620. The message listener 615 receives messages from the message component 109, and sends the information to the transaction manager 605. The message sender 620 receives message information from the transaction manager 605, prepares a corresponding message, including the transaction ID identifying the transaction context 610, and sends the message to the message component 109 for reliable delivery to devices 110. The message listener 615 and message sender 620 components may be implemented as part of the transaction manager 605.

Figure 6B:
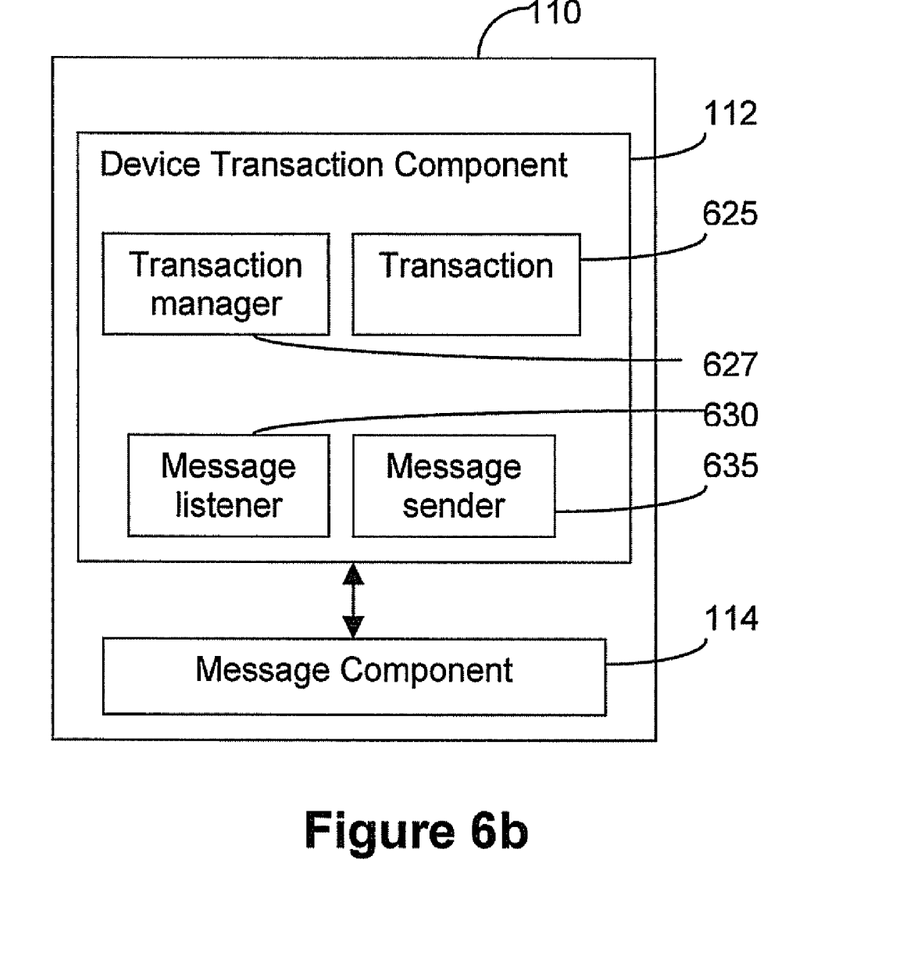
FIG. 6b depicts in a block diagram, illustrative logical components of a mobile device in accordance with the present disclosure.

FIG. 6b depicts in a block diagram, illustrative logical components of a mobile device 105 in accordance with the present disclosure. The device 110 comprises a message component 114, and a lifecycle transaction component 112. The message component 114 reliably sends messages received from the lifecycle transaction component 112 to the server 105, and reliably delivers messages to the lifecycle transaction management component received from the server 105.

The lifecycle transaction component 112 comprises a device transaction manager 627, a transaction 625, a device message listener 630, and a device message sender 635. The device transaction manager 627, executes transactions and commits or rolls back transactions according to messages received from the server 105. The device message listener 630 receives messages from the device message component 114, and sends the information to the device transaction manager 627. The message sender 635 receives message information from the device transaction manager 627, prepares a corresponding message, including the transaction ID identifying the transaction context, and sends the message to the message component 114 for reliable delivery to the server. The message listener 630 and message sender 635 components may be implemented as part of the transaction manager 627.

Figure 7:
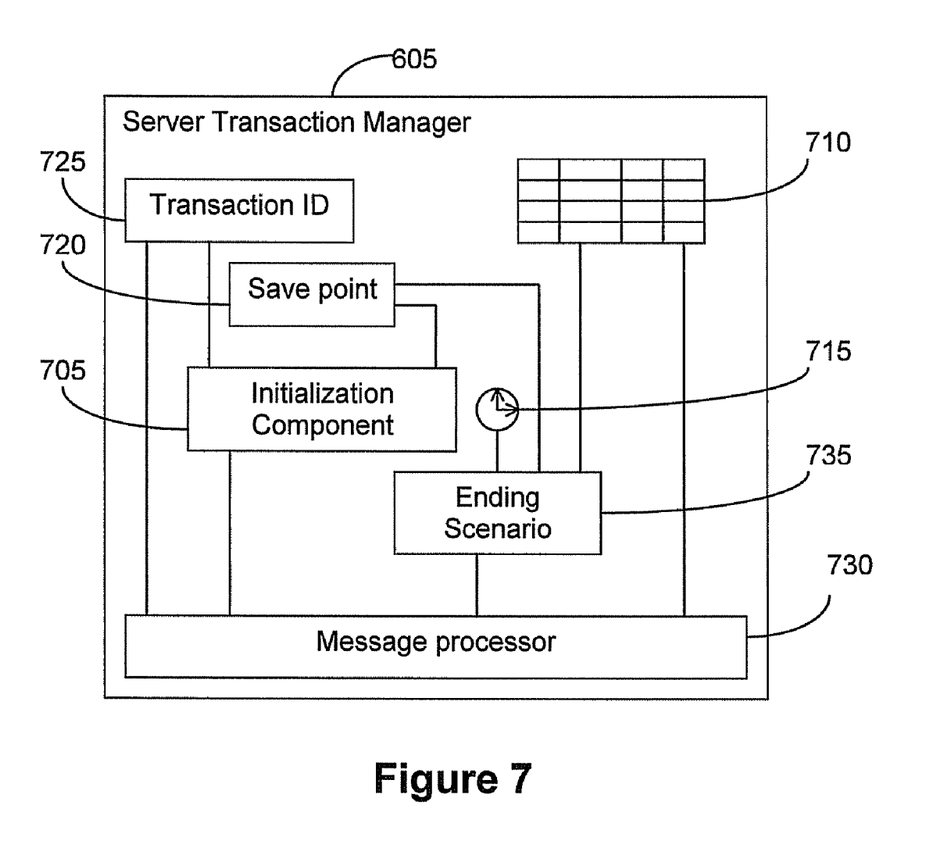
FIG. 7 depicts in a block diagram logical components of a server transaction manager in accordance with the present disclosure.

FIG. 7 depicts in a block diagram, illustrative logical components of a server transaction manager 605. The transaction manager 605 may comprise an initialization component 705, a device table 710, a timeout timer component 715, a server save point 720 for storing application metadata, a transaction ID 725, a message processor component 730 and an ending scenario processor component 735. The message processor component 730 may implement the message listener 615 and the message sender 620 components, if they are implemented as part of the transaction manager component 605.

The initialization component 705 may receive a transaction definition and initialize the transaction manager 605 and transaction context accordingly. This initialization may include storing a unique transaction ID 725, initializing the timeout timer 715 to the time specified in the transaction definition, generating a device table 710 for storing messages sent and received from devices 110 participating in the transaction, storing the server save point information 720. Once the transaction manager 605 and transaction context initialization is complete, the initialization component 705 may indicate to the message processor 730 to send the transaction messages to the devices 110, the initialization component 730 may also start the timeout timer component 715 once the transaction context 610 is initialized.

The device table 710 may store information on messages sent and received between the server transaction manager 605 and device transaction manager 627. The device table 710 may include an unique entry for each device 110 participating in the transaction, including a unique identifier for each of the mobile devices participating in the transaction context, such as for example, a PIN, IMEI or ESN. The device 710 table may indicate what messages have been sent to the device 110, what messages have been received by the device 110 and the results of transaction execution on a device 110. For example, assuming a transaction involving 3 participating devices, table 1 depicts a possible device table 710 during transaction execution.

TABLE 1

Table depicting an exemplary device table 710

| Device | Transaction sent | Transaction received | Transaction execution |
| --- | --- | --- | --- |
| 1 | Yes | Yes | Success |
| 2 | Yes | Yes | Failed |
| 3 | Yes | No | Null |

The table may store an entry for each device according to a unique device identifier (1, 2, 3 in the above table). The transaction execution information of the device table 710 indicates the result of executing the transaction on particular devices (the transaction status), and may be indicated in a transaction execution message sent by a device. The transaction status may also be set as a result of the timeout timer expiring, for example if the timeout timer expires prior to receiving a transaction execution message, the transaction status for the device may indicate that the transaction execution failed, or no response was received from the mobile device. This information may then be used during the evaluation of the ending scenario. Additional information may be included in the transaction execution messages, for example, indicating the reason the transaction execution failed on a device 110. It may not be necessary to store information on whether messages were sent or received, since a reliable message protocol is used. However, by including this information it may be possible to more accurately identify causes for transaction execution failure. For example, if a message is sent to a device 110 but not received, then it may be assumed that the device 110 is off or out of communication. This information may be used by the ending scenario component 735. For example, an ending scenario could indicate that a transaction should only be committed on devices 110 if it was successfully executed on all devices 110, or if the reason it wasn't executed on a particular device 110 was that the device 110 was off (i.e. the transaction message was not received).

The message processor component 730 sends and receives message information to and from the message sender 620 and message listener 615 components. Alternatively, the message sender 620 and message listener 615 components may be implemented as part of the message processor component 730. Upon receiving new message information, the message processor 730 evaluates the message information and adds the information to the device table 710 if appropriate. For example the message component 110 may receive message information indicating that device 1 (from table 1) has successfully executed the transaction. In such a case the message processor 730 updates the device table 710 to indicate this. Upon receiving new message information the message processor 730 determines if more responses are expected from devices 110, if they are the message processor 730 continues to wait for message information. If all expected responses have been received, the message processor 730 cancels the timeout timer component 715 and indicates to the ending scenario component 735 that all responses have been received, and the ending scenario may be evaluated.

The ending scenario component 735 determines the actions to take once all of the mobile devices 110 have sent messages indicating the result of transaction execution. The ending scenario may also be evaluated if the timeout timer 715 expires prior to all expected messages being received, or if a transaction failed to execute successfully on one or more devices. The ending scenario component 735 uses information in the device table 710, as well as information from the transaction context, to determine the actions to take. For example, in one case the transaction context may indicate that if all devices 110 execute the transaction successfully then the transaction should be committed on the device, and that if a single device 110 fails to execute the transaction successfully, all transactions should be rolled back on the device. The ending scenario information in the transaction definition may be more complex. For example, it may indicate that a transaction is committed on those devices 110 that have successfully executed the transaction if a minimum number of devices 110 successfully executed the transaction. Furthermore, the ending scenario may indicate additional transactions to execute on devices 110. For example if a device 110 fails to execute a transaction, the ending scenario may indicate that another transaction should be attempted to be executed by the device 110, and if that transaction is successfully executed, then the failed transaction may be retried on the device 110. The ending scenario component 735 sends the appropriate message information to the message processor 730. The message information indicates whether devices 110 should commit or roll-back the transaction. The ending scenario component 735 may also be responsible for committing or rolling back transaction contexts on the server 105. Rolling back or committing the transaction context on the server may comprise restoring mobile application information to that stored in the server save point or deleting the server save point to commit the changes made to the application information. The server save point may include information for each device that can be either rolled back or committed based upon the result of executing the transaction on the particular device.

Figure 8:
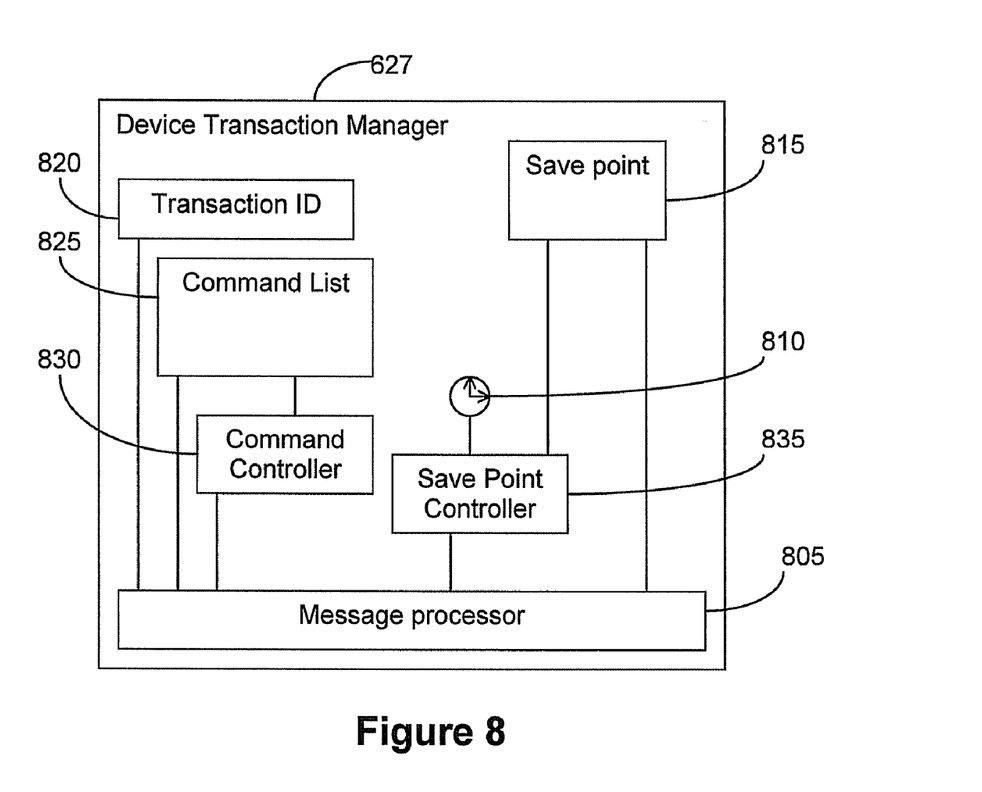
FIG. 8 depicts in a block diagram logical components of a device transaction manager in accordance with the present disclosure.

FIG. 8 depicts in a block diagram, illustrative logical components of a device transaction manager 627. The device transaction manager 627 comprises a message processor component 805, a transaction abort timer component 810, a device save point 815 for storing a mobile device state prior to executing the transaction, a transaction ID 820, transactions command list 825, a command controller component 830 and a save point controller component 835. When a new transaction message is received from a server 105, a new device transaction context 500 is created, as well as storing the save point information to the save point 815, initializing and starting the transaction abort timer 810, and storing the transaction ID 820.

The message processor component 805 sends and receives message information to and from the server 105 (using the message listener component 630 and the message sender component 634). The message listener 630 and the message sender 625 components may be implemented as part of the message processor component 805. The message processor component 805 may add commands to the transaction command list 825. For example, a transaction may be sent to the device 110 in a single message or in multiple messages. The message processor 805 may add commands to the transaction command list 825 as they are received. The command controller component 830 executes the commands in the transaction command list 825 in the order they appear. The command list may include a start command indicating to the command controller component 830 that the next command is the first command to be executed, and an end command indicating to the command controller component 830 that there are no further commands to execute. Alternatively, the transaction may indicate the number of commands in the transaction, and the command controller component 830 may use this to determine when there are no further commands to execute. If the command controller component 830 executes all of the commands successfully, it indicates this to the message processor 805, which subsequently prepares the message information to be sent to the server 105 indicating the successful execution of the transaction. If the command controller component 830 fails to successfully execute a command, it indicates this to the message processor component 805 which prepares message information for indicating the failure to the server 105.

The message processor component 805 may receive information regarding whether to commit or roll back a transaction in an ending scenario message. This information is passed to the save point controller 835 which then either commits or rolls back the transaction, and subsequently deletes the save point 815, or restores the device state to that of the save point 815.

The save point controller component 835 may also roll back a transaction if the abort timer component 810 times out prior to receiving commit/roll back information from the transaction processor component 805. The abort timer 810 allows a transaction to be rolled back if no ending scenario message is received from the server 105 for a period of time.

One skilled in the art will realize that the system and methods described herein may provide for mobile application lifecycle management in a timed manner. In this manner, mobile application lifecycle management commands can be delivered to and executed on mobile devices in a certain period of time. If a mobile device does not successfully execute a transaction command, the server may invalidate the transaction on devices.

Furthermore the system and methods described herein may allow a series of lifecycle management commands to be executed in an atomic and ordered manner. In this way, all commands must be executed successfully in the specific order; otherwise, none of them are executed.

Further still the system and methods described herein may allow a mobile application lifecycle management commands to be delivered and executed on all specified devices within a certain time period; otherwise, the command execution is rolled back on devices.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage device for execution by a programmable processor; and method actions within the scope of the present patent disclosure can be performed by a programmable processor executing a program of instructions to perform functions of the patent disclosure by operating on input data and generating output. Embodiments within the scope of the present patent disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). While particular embodiments of the present patent disclosure have been shown and described, changes and modifications may be made to such embodiments without departing from the true scope of the patent disclosure.

The invention claimed is:

1. A method of transactional application lifecycle management for mobile devices, the method comprising the steps of:
creating a transaction context comprising a transaction command for management of an application;
sending the transaction context in a transaction context message to a plurality of mobile devices;
creating and starting a timeout timer for initiating the evaluation of an ending scenario;
evaluating the ending scenario after the expiration of the timeout timer based on transaction statuses of the plurality of mobile devices; and
sending an ending scenario message to each of the plurality of mobile devices based on the evaluation of the ending scenario.

2. The method as claimed in claim 1, further comprising the steps of:
creating a server save point for storing server state information prior to sending the transaction context message, the server state information including application metadata associated with the plurality of mobile devices; and
restoring the server state information to the server save point or deleting the server save point based on the evaluation of the ending scenario.

3. The method as claimed in claim 1, further comprising the steps of:
receiving a transaction execution message indicating a transaction execution status of one of the plurality of mobile devices; and
setting the transaction status of the one mobile device based on the transaction execution status of the received transaction execution message.

4. The method as claimed in claim 3, wherein once the transaction status of all mobile devices of the plurality of mobile devices has been set, performing the step of evaluating the ending scenario.

5. The method as claimed in claim 4, further comprising the steps of:
upon expiration of the timeout timer, for each mobile device of the plurality of mobile devices:
determining if the transaction execution message has been received; and if the transaction execution message has not been received for each mobile device, setting the transaction status to indicate a transaction execution message has failed to be received.

6. The method as claimed in claim 1, wherein the step of evaluating the ending scenario further comprises the step of determining mobile device instructions to be included in the ending scenario message, based on the transaction statuses of each of the mobile devices.

7. The method as claimed in claim 6, wherein the mobile device instructions included in the ending scenario message include commit instructions for committing the transaction on the mobile device when all mobile devices have successfully executed the transaction.

8. The method as claimed in claim 6, wherein the mobile device instructions included in the ending scenario message include roll back instructions for rolling back the transaction on the mobile device, when all mobile devices have unsuccessfully executed the transaction or a transaction status threshold has been exceeded.

9. The method as claimed in claim 6, wherein the mobile device instructions included in the ending scenario message include status specific instruction for committing the transaction on successful mobile devices and rolling back the transaction on unsuccessful mobile devices, when a transaction status threshold has been exceeded.

10. The method as claimed in claim 1, wherein the transaction command comprises one of:
a transaction start command;
a transaction end command;
an application install command;

an application upgrade command;
an application delete command;
an application quarantine command
an application un-quarantine command;
an application suspend command;
an application resume command; and
a command for changing a mobile device configuration.

11. A lifecycle transaction management system comprising:
a lifecycle transaction server comprising:
a message component for sending and receiving messages to and from a plurality of mobile devices; and
a transaction component comprising a server transaction manager for creating a transaction context comprising a transaction command to be sent to the plurality of mobile devices using the message component, evaluating an ending scenario based on transaction statuses of the plurality of mobile devices, and sending an ending scenario message to each of the plurality of mobile devices based on the evaluation of the ending scenario, wherein the server transaction manager comprises a timer component for creating and starting a timeout timer, and indicating to evaluate the ending scenario upon expiration of the timeout timer.

12. The system as claimed in claim 11, wherein the server transaction manager comprises a server save point component for creating a server save point for storing server state information prior to sending the transaction context message, and restoring the server state information to the server save point or deleting the server save point based on the evaluation of the ending scenario, the server state information including application metadata associated with the plurality of mobile devices.

13. The system as claimed in claim 11, wherein the transaction manager further determines mobile device instructions to be included in the ending scenario message, based on the transaction statuses of each of the mobile devices.

14. The method as claimed in claim 13, wherein the mobile device instructions included in the ending scenario message include commit instructions for committing the transaction on the mobile device when all mobile devices have successfully executed the transaction.

15. The method as claimed in claim 13, wherein the mobile device instructions included in the ending scenario message include roll back instructions for rolling back the transaction on the mobile device, when all mobile devices have unsuccessfully executed the transaction or a transaction status threshold has been exceeded.

16. The method as claimed in claim 13, wherein the mobile device instructions included in the ending scenario message include status specific instruction for committing the transaction on successful mobile devices and rolling back the transaction on unsuccessful mobile devices, when a transaction status threshold has been exceeded.

17. The system as claimed in claim 11, wherein the transaction command comprises one of:
a transaction start command;
a transaction end command;
an application install command;
an application upgrade command;
an application delete command;
an application quarantine command
an application un-quarantine command;
an application suspend command;
an application resume command; and
commands for changing a device configuration.

18. The system as claimed in claim 11, further comprising:
a unique transaction ID associated with the transaction context;
a device table for storing information associated with messages sent between the transaction manager and the device, the messages associated with the transaction context;
a timeout timer associated with the transaction context for generating a timeout event if a transaction execution message is not received from the device within the timeout period; and
a message processor component for sending and receiving the messages associated with the transaction context.

* * * * *